United States Patent
Yoo et al.

(10) Patent No.: US 11,913,501 B2
(45) Date of Patent: Feb. 27, 2024

(54) APPARATUS FOR POWER TRANSMISSION OF VEHICLE

(71) Applicant: HYUNDAI MOBIS CO., LTD., Seoul (KR)

(72) Inventors: Ji Ho Yoo, Yongin-si (KR); Sang Mok Lee, Yongin-si (KR); Byeung Jin Choi, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 449 days.

(21) Appl. No.: 17/380,345

(22) Filed: Jul. 20, 2021

(65) Prior Publication Data

US 2022/0021270 A1     Jan. 20, 2022

(30) Foreign Application Priority Data

Jul. 20, 2020   (KR) .................. 10-2020-0089615

(51) Int. Cl.
   *F16D 1/10*     (2006.01)
   *F16D 1/06*     (2006.01)
   *H02K 7/00*     (2006.01)

(52) U.S. Cl.
   CPC .......... *F16D 1/10* (2013.01); *F16D 2001/062* (2013.01); *F16D 2001/103* (2013.01); *H02K 7/003* (2013.01); *Y10T 403/7035* (2015.01)

(58) Field of Classification Search
   CPC ....... B62D 5/04; B62D 5/0403; F16D 1/0894; F16D 1/10; F16D 1/101; F16D 3/76;
   (Continued)

(56) References Cited

U.S. PATENT DOCUMENTS 1,087,204 A * 2/1914 Washburne ............. B02C 2/005
                                                    403/359.5
1,636,262 A * 7/1927 Troendly .................. F16D 3/72
                                                    403/359.5
(Continued)

FOREIGN PATENT DOCUMENTS

CN       107076215 A      8/2017
JP     2008-309260 A     12/2008
(Continued)

OTHER PUBLICATIONS

Chinese Office Action dated Apr. 25, 2023, issued in corresponding Chinese Patent Application No. 202110819518.8.

*Primary Examiner* — Josh Skroupa
(74) *Attorney, Agent, or Firm* — Morgan, Lewis & Bockius LLP

(57) ABSTRACT

An apparatus for power transmission of a vehicle, including a motor having a motor spline unit extending therefrom, and configured to generate power, a rotating body configured to receive the power and rotate, and a coupler having a toothed structure including grooves and having an exterior to be coupled to the motor spline unit and an interior to be coupled to the rotating body, wherein a width of the grooves formed at one end of the interior is larger than a width of the grooves formed at an opposite end of the interior, a width of the grooves formed at one end of the exterior is smaller than a width of the grooves formed at an opposite end of the exterior, and the coupler is coupled in a tension coupling with the rotating body and the motor.

6 Claims, 8 Drawing Sheets

(58) Field of Classification Search
CPC ........ F16D 2001/062; F16D 2001/103; H02K 7/003; Y10T 403/7026; Y10T 403/7028; Y10T 403/7031; Y10T 403/7032; Y10T 403/7033; Y10T 403/7035; Y10T 403/7047; Y10T 403/7051; Y10T 403/7052; Y10T 403/7061
USPC ......... 403/359.1, 359.2, 359.3, 359.4, 359.5, 403/359.6, 365, 367, 372
See application file for complete search history.

(56) References Cited

U.S. PATENT DOCUMENTS

| | | | |
|---|---|---|---|
| 5,201,679 A * | 4/1993 | Velte, Jr. | B63H 23/34 440/49 |
| 9,441,678 B2 * | 9/2016 | Nelson | A01D 75/182 |
| 9,458,871 B2 * | 10/2016 | Ishizaki | F16D 1/06 |
| 9,527,523 B2 * | 12/2016 | Chae | F16D 1/101 |
| 10,183,691 B2 * | 1/2019 | Segawa | F16D 3/76 |
| 2015/0367880 A1 | 12/2015 | Chae et al. | |
| 2016/0046322 A1 | 2/2016 | Unno | |
| 2017/0174250 A1 | 6/2017 | Segawa | |

FOREIGN PATENT DOCUMENTS

| | | | | |
|---|---|---|---|---|
| JP | 2009-051441 A | | 3/2009 | |
| WO | WO-9605101 A1 * | | 2/1996 | ............... F16D 1/06 |
| WO | WO-2006002463 A1 * | | 1/2006 | ............... F16D 3/76 |

\* cited by examiner

APPARATUS FOR POWER TRANSMISSION OF VEHICLE

CROSS-REFERENCE TO RELATED APPLICATIONS

This application is based on, and claims priority from, Korean Patent Application Number 10-2020-0089615, filed Jul. 20, 2020, the disclosure of which is incorporated by reference herein in its entirety.

TECHNICAL FIELD

The present disclosure in some embodiments relates to an apparatus for power transmission of a vehicle.

BACKGROUND

The statements in this section merely provide background information related to the present disclosure and do not necessarily constitute prior art.

A backlash generally refers to a gap in a pair of gears when meshed with each other, occurring between the tooth surfaces of the gears. Too small a backlash would cause a lot of power loss due to friction between gears and generate heat in the gears. On the other hand, too large a backlash would lower the action ratio of the gears, making them vulnerable to damage or breakage and leading to noisy gear operations. Therefore, an appropriate backlash needs to be secured to increase power transmission efficacy and prevent unnecessary noise generation. Such a backlash occurs not only in gears but also in screws. For instance, machine tools use ball screws that involve a backlash occurring between screw bolts and nuts.

The backlash is still necessary for assembly between a rotating body and a coupler or between a motor and a coupler, but the motor works over time causing the motor spline to be worn down to increase the backlash between the motor spline and the coupler, and thus aggravating the noise and vibration severity.

Additionally, at an abrupt change of the rotational direction of the rotating body, the rotating body and the coupler may collide to incur lethal damages.

SUMMARY

According to at least one embodiment, the present disclosure provides an apparatus for power transmission of a vehicle, including a motor having a motor spline unit extending therefrom, and configured to generate power, a rotating body configured to receive the power and rotate, and a coupler having a toothed structure including grooves, and having an exterior configured to be coupled to the motor spline unit and an interior configured to be coupled to the rotating body. Here, a width of the grooves formed at one end of the interior is larger than a width of the grooves formed at an opposite end of the interior. A width of the grooves formed at one end of the exterior is smaller than a width of the grooves formed at an opposite end of the exterior. The coupler is coupled in a tension coupling with the rotating body and the motor.

REFERENCE NUMERALS

Figure 1A:
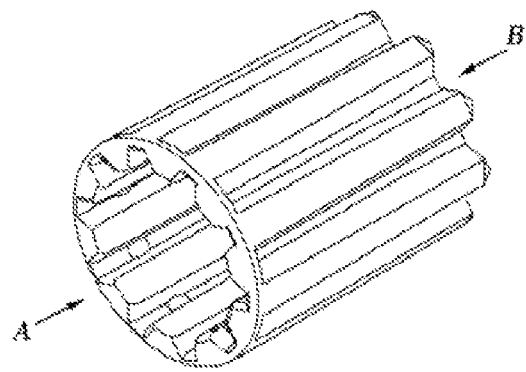
FIGS. 1A and 1B are perspective views of a coupler according to at least one embodiment of the present disclosure.

110: rotating body 120: coupler
130: motor
121a: one end of coupler interior (or coupler interior-one end)
121b: opposite end of coupler interior (or coupler interior-far end)
122a: one end of coupler exterior (or coupler exterior-one end)
122b: opposite end of coupler exterior (or coupler exterior-far end)
131a: one end of motor spline unit (or spline near end)
131b: opposite end of motor spline unit (or spline far end).

DETAILED DESCRIPTION

Given the deficiencies of prior art, the present disclosure in at least one embodiment arranges the motor and the rotating body to be tension coupled to the coupler which is made of an elastic body for serving as a spring between the motor and the rotating body. The springy coupler is responsive to the vehicle in the event of a sudden stop, for example, a change of the rotation direction of the rotating body for prolonging the duration of collision between the rotating body and the coupler, and accordingly, decreasing the magnitude of the impact force received by the coupler. Accordingly, the present disclosure seeks to reduce the risk of breakage of the coupler. The present disclosure also seeks to take advantage of the alleviation of collision to mitigate the noise generated during the collision.

Additionally, the present disclosure provides the coupler with one end to be out of contact with the rotating body but to be in contact with the motor spline so that the one end of the coupler is subjected only to a compressive force. Therefore, the one end of the coupler is not tensioned by an external force. Taking advantage of this configuration for eliminating tension from occurring in the coupler, the present disclosure further seeks to prevent tension and fracture of the coupler in a low-temperature state, e.g., a low-temperature fracture from occurring and thereby increase the durability of the coupler.

Some exemplary embodiments of the present disclosure are described below with reference to the accompanying drawings. In the following description, like reference numerals preferably designate like elements, although the elements are shown in different drawings. Further, in the following description of some embodiments, a detailed description of known functions and configurations incorporated herein will be omitted for the purpose of clarity and for brevity.

Additionally, alphanumeric codes such as first, second, i), ii), a), b), etc., in numbering components are used solely for the purpose of differentiating one component from the other but not to imply or suggest the substances, the order, or sequence of the components. Throughout this specification, when parts "include" or "comprise" a component, they are meant to further include other components, not excluding thereof unless there is a particular description contrary thereto.

Figure 1B:
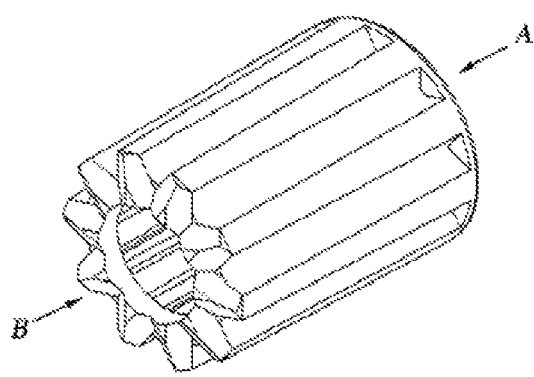

FIGS. 1A and 1B are perspective views of a coupler according to at least one embodiment of the present disclosure.

Figure 2A:
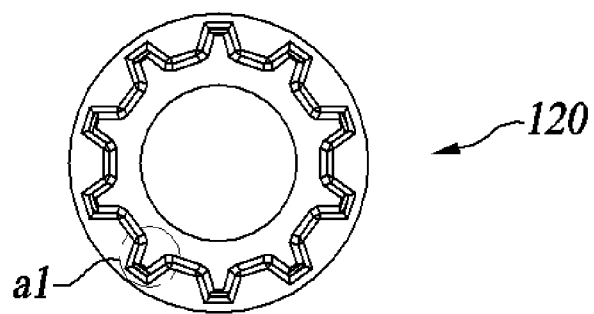
FIGS. 2A, 2B, and 2C are an end view of a coupler at its side for a rotating body to enter and diagrams of a vehicle power transmission apparatus according to at least one embodiment before and after assembly.
Figure 2B:
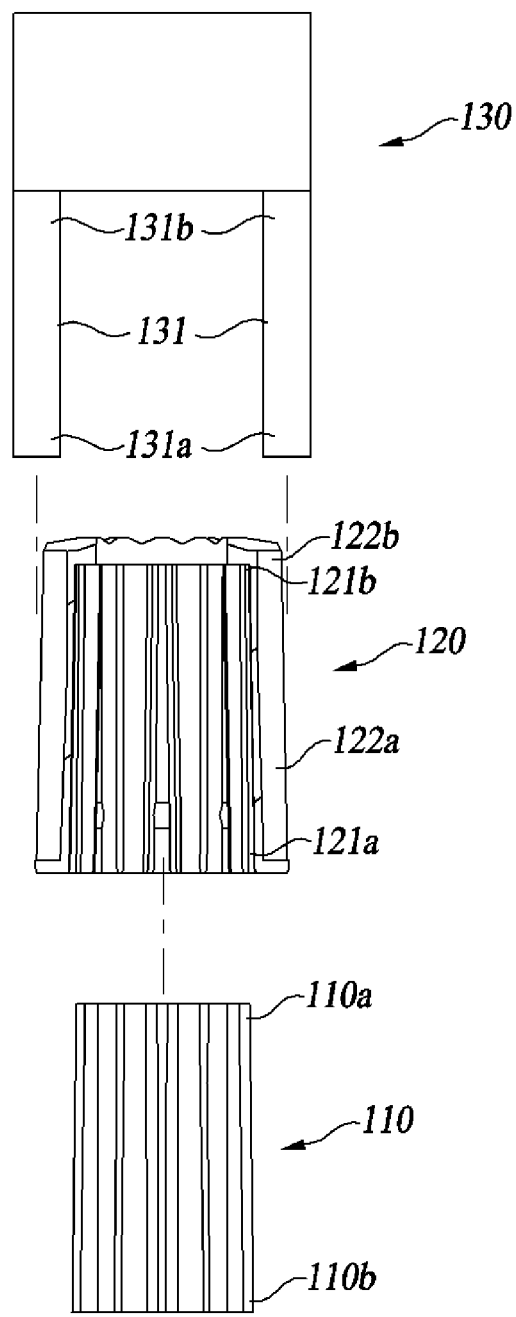
Figure 2C:
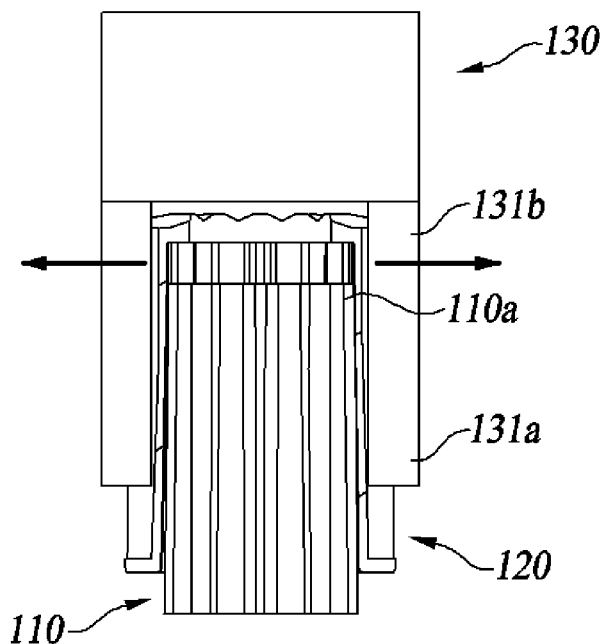

FIGS. 2A, 2B, and 2C are an end view of a coupler at its side for a rotating body to enter and diagrams of a vehicle power transmission apparatus according to at least one embodiment before and after assembly.

As shown in FIG. 1A to FIG. 2C, according to at least one embodiment of the present disclosure, a vehicle power transmission apparatus includes a rotating body 110, a coupler 120, and a motor 130.

The rotating body 110 has a rotor near end 110a and a rotor far end 110b ("far" relative to the one end), wherein the rotor near end 110a refers to the rotating body portion to be in contact with the coupler 120 and the rotor far end 110b refers to the rotating body portion to be out of contact with the coupler 120.

The rotating body 110 is driven by receiving the power of the motor 130 through the coupler 120.

The coupler 120 may be described by spatially relative terms as oriented in an assembly process as follows. The coupler 120 as viewed in FIG. 1 has a direction A that may be termed as a rotating-body entryway representing a direction of, for example, the rotating body 110 entering the coupler 120. Additionally, the interior surface of the coupler 120 to which the rotating body 110 is coupled is referred to as a coupler interior.

Meanwhile, the coupler 120 has a direction B that may be termed as a motor's entryway representing a direction of, for example, the coupler 120 to enter the motor 130. Additionally, the exterior surface of the coupler 120 to which the motor 130 is coupled is referred to as a coupler exterior.

The coupler 120 has two ends termed based on the direction in which the rotating body 110 enters, which are one end of the coupler interior, or briefly termed a coupler interior-one end 121a and the opposite end of the coupler interior, or briefly termed a coupler interior-far end 121b. The coupler 120 further has two ends termed based on the direction in which it enters the motor 130, which are one end of the coupler exterior, or briefly termed a coupler exterior-one end 122a and the opposite end of the coupler exterior, or briefly termed a coupler exterior-far end 122b.

The coupler interior-one end 121a is out of contact with the rotor far end 110b, and the coupler interior-far end 121b is in contact with the rotor near end 110a.

The coupler exterior-one end 122a is in contact with one end of a motor spline unit 131, or briefly termed a spline near end 131a, and the coupler exterior-far end 122b is out of contact with the opposite end of the motor spline unit 131, or briefly termed a spline far end 131b.

The motor 130 includes a housing (not shown), the motor spline unit 131, and a driving axle (not shown).

The housing is formed to surround the motor 130, protecting the motor 130 from the outside.

The motor spline unit 131 is a shaft that extends externally of the motor housing and transmits power, for example, the rotational force generated from the motor 130 to the coupler 120.

The motor spline unit 131 has the spline near end 131a that refers to its part in contact with the coupler 120 and the spline far end 131b that refers to its part out of contact with the coupler 120.

FIG. 2A is an end view of the coupler 120 at its side for the rotating body entry.

As shown in FIGS. 2A, 2B, and 2C, the coupler 120 has an end face of a predetermined shape, e.g., a circular shape at its side for the rotating body entry. The interior of the circular coupler walls is formed with an internally toothed structure to be coupled with the rotating body 110. Here, the internally toothed structure is formed with a plurality of grooves along inner circumferential surfaces of the circular coupler walls.

FIG. 2A indicates at a1 the grooves of the internally toothed structure of the coupler 120 at its interior for the rotating body entry, according to at least one embodiment of the present disclosure. The grooves in the toothed structure are each composed of four surfaces, each surface being graded at a certain angle, for example, 0.8 to 1.4 degrees, and more specifically, 1.1 degrees.

With the graded formation of the grooves of the toothed structure, when the rotating body 110 is coupled to the coupler 120, the more the rotor near end 110a enters the coupler interior-far end 121b, the smaller the gap remains between the rotating body 110 and the coupler 120 in the course of insertion. The coupling process will be described in more detail in FIG. 2B.

FIG. 2B is a diagram of the vehicle power transmission apparatus before assembly.

As shown in FIG. 2B, the coupler 120 is formed with the grooves that are wider at the coupler interior-one end 121a where the coupler 120 begins to meet the rotating body 110 during assembly and that are narrowing down toward the coupler interior-far end 121b where the coupler 120 and the rotating body 110 complete their assembly process. Thanks to the varying width of the grooves, the deeper the entrance of the rotating body 110 into the coupler 120 during assembly, the less the gap between them, resulting in the rotating body 110 and the coupler 120 fitted more tightly.

In the detailed description of the present disclosure, coupling the rotating body 110 or the motor spline unit 131 to the coupler 120 in a tight fit engagement is referred to as tension coupling.

When the rotating body 110 enters all the way and tightly fitted into the coupler 120, the coupler 120 is expansively coupled with the rotating body 110. As shown in FIG. 2B, by expansively coupling with the rotating body 110, the detailed description herein refers to the tension coupling between the rotating body 110 and the coupler 120 with the rotor near end 110a exerting a force that pushes the coupler 120 outward, e.g., the expansion force on the coupler 120. Therefore, the coupler 120 is coupled with and expanded by the rotating body 110.

FIG. 2C is a diagram of the vehicle power transmission apparatus after assembly.

FIG. 2C illustrates arrows that indicate the force of the rotor near end 110a pushing the coupler 120 outwardly, that is, then expansion force of the rotor near end 110a.

Even when the coupler 120 is expansively coupled with the rotating body 110, no low-temperature fracture will occur. Here, the low-temperature fracture refers to a phenomenon in which the coupler 120 when tensioned in a low-temperature condition is fractured, failing to withstand the tensile force. The low-temperature fracture occurs as follows. The coupler 120 at a relatively high temperature has a relatively large strain that is high deformability upon receiving an expansion force or a compressive force, i.e., it is highly deformable nondestructively when tensioned. However, the coupler 120 at a relatively low temperature has a relatively small strain or low deformability by which the coupler 120 can deform nondestructively under an expansion force or a compressive force. With this in mind, setting the strain of the coupler 120 to be based on a high temperature to nondestructively deform under an expansion force or a compressive force might cause the coupler 120 to be fractured at a low temperature or suffer from the low-temperature fracture.

However, the coupler 120 according to at least one embodiment of the present disclosure is free of a low-temperature fracture.

As shown in FIG. 2C, when expanding by receiving the expansion force from the rotating body 110, the exterior of the coupler 120 to enter the motor, e.g., the coupler exterior-far end 122b remains out of contact with the spline far end 131b. In other words, even when the rotating body 110 exerts an expansion force to the coupler 120, the coupler exterior-far end 122b remains out of contact with the spline far end 131b, thereby eliminating a low-temperature fracture issue from occurring due to tension.

No low-temperature fracture could occur in the coupler 120 unless, for example, the coupler interior-far end 121b receives an expansion force, and the coupler exterior-far end 122b receives a compressive force causing a deformation, for example, tension to occur at the far ends of the coupler 120. However, of the couplers far ends 121b and 122b, the coupler interior-far end 121b alone is configured to receive the expansion force, clearing the coupler exterior-far end 122b from receiving a compressive force and thereby leaving the coupler 120 untensioned. Accordingly, the coupler 120 is subjected to distortion only, but no tension, thereby causing no low-temperature fracture to occur.

Additionally, the interior of the coupler 120 is formed to have a constant interval between the rotating body 110 and the coupler 120 for concentricity compensation. Here, the concentricity compensation refers to performing a compensation so that the backlash is determined between the coupler 120 and the rotating body 110 or between the coupler 120 and the motor spline unit 131 to keep the motor spline unit 131 and the rotating body 110 aligned in a parallel arrangement.

Figure 3A:
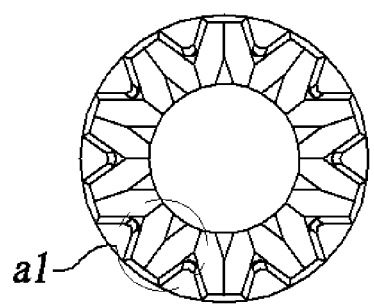
FIGS. 3A, 3B, and 3C are an end view of a coupler at its side to enter a motor and diagrams of a vehicle power transmission apparatus according to at least one embodiment before and after assembly.
Figure 3B:
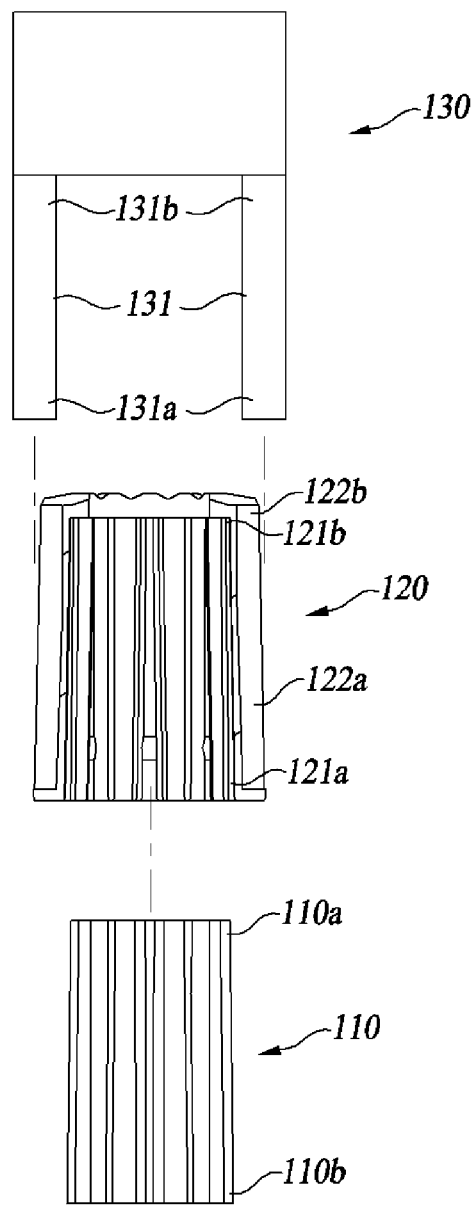
Figure 3C:
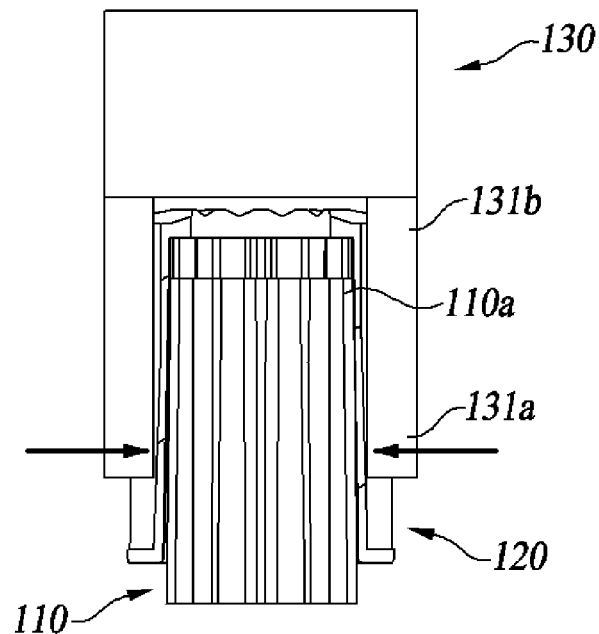

FIGS. 3A, 3B, and 3C are an end view of a coupler at its side to enter a motor and diagrams of a vehicle power transmission apparatus according to at least one embodiment before and after assembly.

FIG. 3A is an end view of the coupler 120 at its side to enter the motor 130.

As shown in FIGS. 3A, 3B, and 3C, the coupler 120 has an interior surface of a predetermined shape, e.g., a circular shape at its side to enter the motor 130. The exterior of the circular coupler walls is formed with an externally toothed structure to be coupled with the motor spline unit 131. Here, the externally toothed structure is formed with a plurality of grooves along outer circumferential surfaces of the circular coupler walls.

FIG. 3A indicates at a1 the grooves of the externally toothed structure of the coupler 120 at its side to enter the motor 130, according to at least one embodiment of the present disclosure. The grooves in the toothed structure are each composed of three surfaces, each surface being graded at a certain angle, for example, 0.8 to 1.4 degrees, and more specifically, 1.1 degrees.

With the graded formation of the grooves of the toothed structure, when the motor 130 is coupled to the coupler 120, the more the spline near end 131a enters the coupler exterior-one end 122a, the smaller the gap remains between the motor 130 and the coupler 120 in the course of insertion. The coupling process will be described in more detail in FIG. 2B.

FIG. 3B is a diagram of the vehicle power transmission apparatus before assembly.

As shown in FIG. 3B, the coupler 120 is formed with the grooves that are wider at the coupler exterior-far end 122b where the coupler 120 begins to meet the motor 130 during assembly and that are narrowing down toward the coupler exterior-one end 122a where the coupler 120 and the motor 130 complete their assembly process. Thanks to the varying width of the grooves, the deeper the entrance of the coupler 120 into the motor 130 during assembly, the less the gap between them, resulting in the coupler 120 and the motor 130 fitted more tightly.

More specifically, the coupler 120 and the motor 130 are fitted with the spline far end 131b of the motor 130 remaining out of contact with the coupler exterior-far end 122b while the spline near end 131a of the motor 130 being in contact with the coupler exterior-one end 122a.

When the motor spline unit 131 goes all the way and tightly fitted over the coupler 120, the coupler 120 is compressively coupled with the motor 130. As shown in FIG. 3B, by compressively coupling with the motor 130, the detailed description herein refers to the tension coupling between the motor spline unit 131 and the coupler 120 with the spline near end 131a exerting an inward force, e.g., a compressive force on the coupler 120. Therefore, the coupler 120 is coupled with and compressed by the motor 130.

FIG. 3C is a diagram of the vehicle power transmission apparatus after assembly.

FIG. 3C illustrates arrows that indicate the force of the spline near end 131a pushing the coupler 120 inwardly, that is, the compressive force of the rotor near end 110a.

Even when the motor 130 is compressively coupled with the coupler 120, no low-temperature fracture will occur.

As shown in FIG. 3C, when compressed by receiving the compressive force from the motor spline unit 131, the interior of the coupler 120 for the rotating body entry, e.g., the coupler interior-one end 121a remains out of contact with the rotor far end 110b. In other words, even when the motor spline unit 131 exerts a compressive force to the coupler 120, the coupler interior-one end 121a remains out of contact with the rotor far end 110b, thereby eliminating a low-temperature fracture issue from occurring due to tension.

No low-temperature fracture could occur in the coupler 120 unless, for example, the coupler interior-one end 121a receives an expansion force and the coupler exterior-one end 122a receives a compressive force causing a deformation, for example, tension to occur at the one ends of the coupler 120. However, of the couplers one ends 121a and 122a, the coupler exterior-one end 122a alone is configured to receive the compressive force, clearing the coupler interior-one end 121a from receiving a tensile force and thereby leaving the coupler 120 untensioned. This brings the coupler 120 subjected to distortion only, but no tension, and free of a low-temperature fracture.

Additionally, the exterior of the coupler 120 is formed to have a constant interval between the motor 130 and the coupler 120 for concentricity compensation.

Figure 4A:
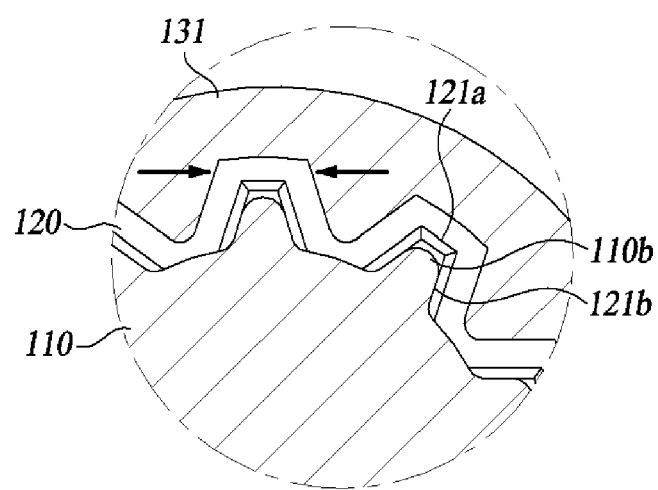
FIGS. 4A and 4B are cross-sectional partial views of a vehicle power transmission apparatus at upper and lower levels according to at least one embodiment of the present disclosure.
Figure 4B:
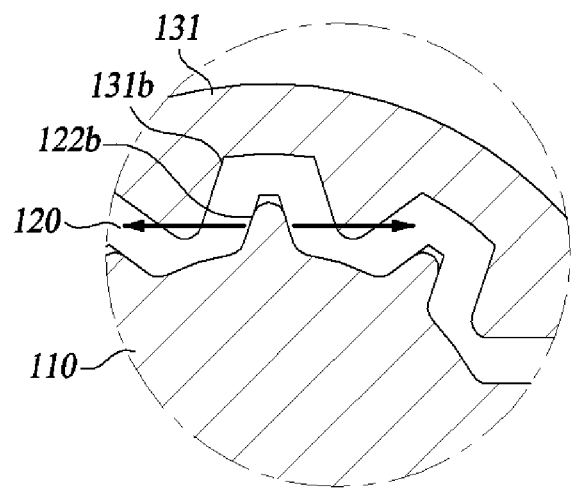

FIGS. 4A and 4B are cross-sectional partial views of a vehicle power transmission apparatus at lower and upper levels respectively, according to at least one embodiment of the present disclosure. FIG. 4A is a cross-sectional view of a lower portion of the coupler 120, and FIG. 4B is a cross-sectional view of an upper portion of the coupler 120.

FIG. 4A illustrates arrows for indicating that the motor spline unit 131 applies a compressive force to the coupler 120.

As shown in FIG. 4A, the motor spline unit 131 in the lower cross-section of the coupler 120, applies a compressive force inwardly of the coupler 120. Even when compressed inwardly thereof, the coupler 120 keeps the coupler interior-one end 121a from contacting the rotor far end 110b. This is because the coupler interior-one end 121a into which the rotating body 110 enters has the grooves formed to be wider than at the coupler interior-far end 121b.

FIG. 4B illustrates arrows for indicating that the rotating body 110 applies an expansion force to the coupler 120.

As shown in FIG. 4B, the rotating body 110 in the upper cross-section of the coupler 120, exerts an expansion force outwardly of the coupler 120. Even when expanded outwardly, the coupler 120 keeps the coupler exterior-far end 122b from contacting the spline far end 131b. This is because the coupler exterior-far end 122b entering the motor spline unit 131 has the grooves formed to be wider than at the coupler exterior-one end 122a.

Figure 5:
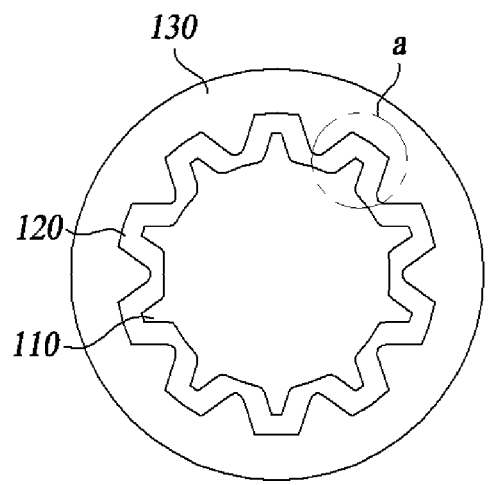
FIG. 5 is an end view of a vehicle power transmission apparatus according to at least one embodiment of the present disclosure.

FIG. 5 is an end view of a vehicle power transmission apparatus according to at least one embodiment of the present disclosure.

FIG. 5 illustrates the rotating body 110, the coupler 120, and the motor spline unit 131 as assembled. As shown in FIG. 5, and in particular at part 'a', the respective components as assembled are the motor spline unit 131, the coupler 120, the rotating body 110, the coupler 120, and the motor spline unit 131 occurring in this order as listed. The order of the assembled components as occurring and illustrated by 'a' will be described in more detail in FIG. 6.

Figure 6:
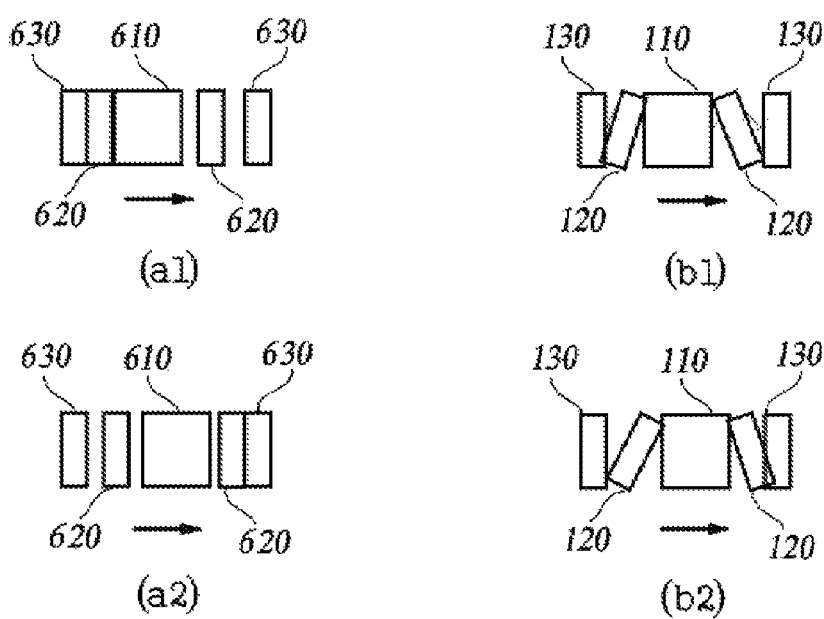
FIG. 6 is diagrams for comparison between a conventional vehicle power transmission apparatus (a1, a2) and a vehicle power transmission apparatus (b1, b2) according to at least one embodiment of the present disclosure.

FIG. 6 illustrates methods of assembly for comparison between a conventional vehicle power transmission apparatus and a vehicle power transmission apparatus according to at least one embodiment of the present disclosure.

FIG. 6 schematically shows at (a1) a conventional vehicle power transmission apparatus having a typical rotating body 610, a typical coupler 620, and a typical motor spline unit 630. FIG. 6 schematically shows at (a2) the conventional vehicle power transmission apparatus when the vehicle makes a sudden stop from the state of (a1) and the typical rotating body 610 is close to colliding with the typical coupler 620.

Whereas, FIG. 6 schematically shows at (b1) a vehicle power transmission apparatus according to at least one embodiment of the present disclosure including a rotating body 110, a coupler 120, and a motor spline unit 131. FIG. 6 schematically shows at (b2) the present vehicle power transmission apparatus when the vehicle makes a sudden stop from the state of (b1) and the rotating body 110 is close to colliding with the coupler 120.

The arrows in FIG. 6 indicate the rotational directions of the vehicle power transmission apparatuses.

The coupler 120 according to at least one embodiment of the present disclosure effects reduced impulse and noise during operation. The effect of reducing the impulse may be detailed by the change amount of momentum as shown in Equation 1.

$$M \times \Delta V = \int F \, dt \quad \text{Equation 1}$$

Here, M is the mass of an object, $\Delta V$ is the change amount of velocity, and $\int F \, dt$ is the change amount of momentum. As shown in Equation 1, when the change amount of momentum is constant, the shorter the collision time dt, the greater the impact force F, which accompanies the increasing likelihood of breakage in the coupler 120. On the other hand, as collision time dt increases, impact force F increases relatively. Therefore, to reduce impact force F applied to the coupler 120, the coupler 120 needs to be designed so that collision time dt is long.

Accordingly, at least one embodiment of the present disclosure configures the motor spline unit 131, the coupler 120, and the rotating body 110 to remain in contact with each other to increase collision time dt.

In the conventional vehicle power transmission apparatus shown in FIG. 6 at (a1) where the vehicle makes a sudden stop, the typical rotating body 610 instantly collides with a groove in contact among the grooves of the typical coupler 620 and the next groove about to come in contact. In the conventional vehicle power transmission apparatus, when a collision occurs between the typical rotating body 610 and the grooves of the typical coupler 620, the typical coupler 620 is so formed to provide a short collision time dt which imparts a relatively large impact force F to the typical coupler 620.

Whereas, as shown in FIG. 6 at (b1) and (b2) according to at least one embodiment of the present disclosure, the rotating body 110, the coupler 120, and the motor spline unit 131 are configured to remain in contact with each other wherein the coupler 120 made of an elastic material is tension-coupled. Accordingly, when a vehicle makes an abrupt stop close to crash engagements around the coupler 120, the coupler 120 serves as a buffer between the motor spline unit 131 and the rotating body 110 which continues to be in contact with the rotating body 110, thereby prolonging collision time dt over the conventional configurations. Accordingly, the vehicle power transmission apparatus according to at least one embodiment allows the coupler 120 to take impact force F that is reduced compared to the conventional vehicle power transmission apparatus. Therefore, even under an abrupt vehicle stop close to crash engagements in the power transmission apparatus, the coupler 120 receives less impact force F, thereby increasing the durability of the coupler product and reducing noise generation.

As described above, the present disclosure in some embodiments provides the vehicle power transmission apparatus configured to have the motor, the coupler, and the rotating body to be in contact with each other, thereby dealing with sudden stops of a vehicle by mitigating the collision between the rotating body and the coupler to reduce noise.

Additionally, according to some embodiments of the present disclosure, the coupler is tension coupled with the rotating body and the motor to prevent tensile stress at one end or the opposite end of the coupler, thereby incurring no fracture issue due to tension, for example, a low-temperature fracture, resulting in increased durability of the coupler.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. An apparatus for power transmission of a vehicle, comprising:
    a motor including a motor spline unit extending therefrom, the motor being configured to generate power;
    a rotating body configured to receive the power and rotate; and
    a coupler having a toothed structure including grooves, the coupler having an exterior configured to be coupled to the motor spline unit and an interior configured to be coupled to the rotating body,
    wherein a width of the grooves formed at one end of the interior is larger than a width of the grooves formed at an opposite end of the interior,
    a width of the grooves formed at one end of the exterior is smaller than a width of the grooves formed at an opposite end of the exterior, and
    the coupler is coupled in a tension coupling with the rotating body and the motor.

2. The apparatus of claim 1, wherein the interior of the coupler has clearance against the rotating body to be assembled inside of the coupler, the clearance with the rotating body being configured to decrease as the rotating body proceeds more into the coupler, and
    wherein the exterior of the coupler has clearance against the motor spline unit to be assembled over the coupler, the clearance with the motor spline unit being configured to decrease as the motor spline unit proceeds more onto the coupler.

3. The apparatus of claim 2, wherein the interior is inclined at an angle with a range of 0.8 to 1.4 degrees as the clearance with the rotating body decreases.

4. The apparatus of claim 2, wherein the exterior is inclined at an angle with a range of 0.8 to 1.4 degrees as the clearance with the motor spline unit decreases.

5. The apparatus of claim 1, wherein the coupler is configured in the tension coupling with the motor spline unit such that the one end of the exterior contacts one end of the motor spline unit while the opposite end of the exterior is spaced apart from an opposite end of the motor spline unit.

6. The apparatus of claim 1, wherein the coupler is configured in the tension coupling with the rotating body such that the opposite end of the interior contacts one end of the rotating body while the one end of the interior is spaced apart from an opposite end of the rotating body.

* * * * *